United States Patent
Weiman et al.

(10) Patent No.: US 10,673,927 B2
(45) Date of Patent: Jun. 2, 2020

(54) EVALUATION OF TCP RESPONSES VIA REMOTE CLIENTS

(71) Applicant: THE SEARCH MONITOR, LLC, Orlando, FL (US)

(72) Inventors: Lori Weiman, Orlando, FL (US); Shaun Martinec, Orlando, FL (US)

(73) Assignee: THE SEARCH MONITOR, LLC, Orlando, FL (US)

(*) Notice: Subject to any disclaimer, the term of this patent is extended or adjusted under 35 U.S.C. 154(b) by 340 days.

(21) Appl. No.: 15/666,203

(22) Filed: Aug. 1, 2017

(65) Prior Publication Data
US 2019/0044996 A1 Feb. 7, 2019

(51) Int. Cl.
| | |
|---|---|
| H04L 29/08 | (2006.01) |
| H04L 29/06 | (2006.01) |
| H04L 12/46 | (2006.01) |
| H04L 12/26 | (2006.01) |
| G06F 8/65 | (2018.01) |
| G06F 16/951 | (2019.01) |
| G06F 16/955 | (2019.01) |
| G06Q 30/02 | (2012.01) |

(52) U.S. Cl.
CPC .............. *H04L 67/025* (2013.01); *G06F 8/65* (2013.01); *G06F 16/951* (2019.01); *G06F 16/955* (2019.01); *H04L 12/4633* (2013.01); *H04L 43/16* (2013.01); *H04L 63/029* (2013.01); *H04L 63/166* (2013.01); *H04L 67/141* (2013.01); *H04L 67/18* (2013.01); *H04L 67/42* (2013.01); *H04L 69/16* (2013.01); *G06Q 30/0261* (2013.01); *G06Q 30/0277* (2013.01); *H04L 67/22* (2013.01)

(58) Field of Classification Search
CPC ............................ H04L 67/025; H04L 43/16
USPC ......................................................... 709/224
See application file for complete search history.

(56) References Cited

U.S. PATENT DOCUMENTS

| | | |
|---|---|---|
| 9,450,836 B2 | 9/2016 | Hammer |
| 2008/0288577 A1 | 11/2008 | Clubb et al. |

(Continued)

FOREIGN PATENT DOCUMENTS

CN 102932196 A 2/2013

OTHER PUBLICATIONS

Ylonen et al., RFC 4254, 2006 (24 pages).*

(Continued)

*Primary Examiner* — Wing F Chan
*Assistant Examiner* — Leon Y Tseng
(74) *Attorney, Agent, or Firm* — Tarolli, Sundheim, Covell & Tummino LLP

(57) ABSTRACT

Systems and methods are provided for monitoring TCP requests via remote clients. A transmission control protocol (TCP) request is received at a monitoring server for a target server. At least one target geographic location is determined for the TCP request. A client of a plurality of available remote clients is selected such that each selected client is within a threshold distance of a determined target geographic location. The TCP request is transmitted from the monitoring server to the selected client. The TCP request is forwarded from the selected client to the target server. A TCP response is received from the target server at the selected client. The TCP response is forwarded from the selected client to the monitoring server.

20 Claims, 3 Drawing Sheets

(56) References Cited

U.S. PATENT DOCUMENTS

| | | | |
|---|---|---|---|
| 2009/0006190 A1 | 1/2009 | Lucash et al. | |
| 2010/0202451 A1* | 8/2010 | Glover | H04L 69/26 370/389 |
| 2013/0166703 A1* | 6/2013 | Hammer | H04L 41/50 709/220 |

OTHER PUBLICATIONS

Ignatchenko, Server-Side Architecture. Front-End Servers and Client-Side Random Load Balancing, 2015 (19 pages).*

Ivanovs, Top 5 Web Search Servers for Your Web Applications, 2014 (12 pages).*

European Extended Search Report, European Patent Application No. 18183075.3; Applicant: The Search Monitor, LLC; Date of Completion: Nov. 27, 2018; 10 pgs.

* cited by examiner

EVALUATION OF TCP RESPONSES VIA REMOTE CLIENTS

TECHNICAL FIELD

This invention relates to computer systems, and more particularly, to systems and methods for evaluating TCP responses via a network of remote clients.

BACKGROUND

Advertisers promote products and services via electronic media through paid ads and free listings that appear on web pages on the internet, such as surrounding or embedded in page content or search engine listings. Advertisers who use electronic means of promotion have a need to gather competitive research data in order to obtain visibility into which ads and free listings appear to consumers, including statistics like the order in which the listings or ads appear on a page, the content of the ads or listings, and the frequency in which the ads or listings appear. The purpose for this visibility includes competitive research information, compliance with intellectual property such as trademarks, and policing compliance by or affiliates with contractual terms and conditions as determined by the advertiser.

SUMMARY OF THE INVENTION

In accordance with an aspect of the present invention, a method is provided. A transmission control protocol (TCP) request is received at a monitoring server for a target server. At least one target geographic location is determined for the TCP request. A plurality of remote clients are monitored to determine a plurality of available remote clients that are a proper subset of the plurality of remote clients. A remote client of a plurality of available remote clients is selected to be within a threshold distance of a determined target geographic location. The TCP request is transmitted from the monitoring server to the selected client. The TCP request is forwarded from the selected client to the target server. A TCP response is received from the target server at the selected client. The TCP response is forwarded from the selected client to the monitoring server.

In accordance with another aspect of the present invention, a system includes a processor and a non-transitory computer readable medium storing machine readable instructions executable by the processor. The machine readable instructions include a request interface that receives a transmission control protocol (TCP) request from a user, and a client database storing parameters for a plurality of remote clients. A client monitoring component monitors the plurality of remote clients to determine which clients of the plurality of remote clients are available and maintains a connection to the available remote clients. A client selection component selects a client from the available remote clients for the TCP request using the parameters from the client database. A request forwarding component restructures the TCP request for transmission to the selected client, transmits the TCP response to the selected client, and receives a TCP response from the client.

In accordance with yet another aspect of the present invention, a method is provided for monitoring search results. A search request is received at a monitoring server for a target search engine. At least one target geographic location is determined for the search request. A plurality of remote clients are monitored to determine a plurality of available remote clients that are a proper subset of the plurality of remote clients. A remote client is selected to be within a threshold distance of a location of the determined at least one target geographic location and geographically distant from the monitoring server. The search request is transmitted from the monitoring server to the selected client. The search request is forwarded from the selected client to the target search engine. A set of search results are received from the target search request at the selected client. The set of search results are forwarded from the selected client to the monitoring server.

DETAILED DESCRIPTION

Figure 1:
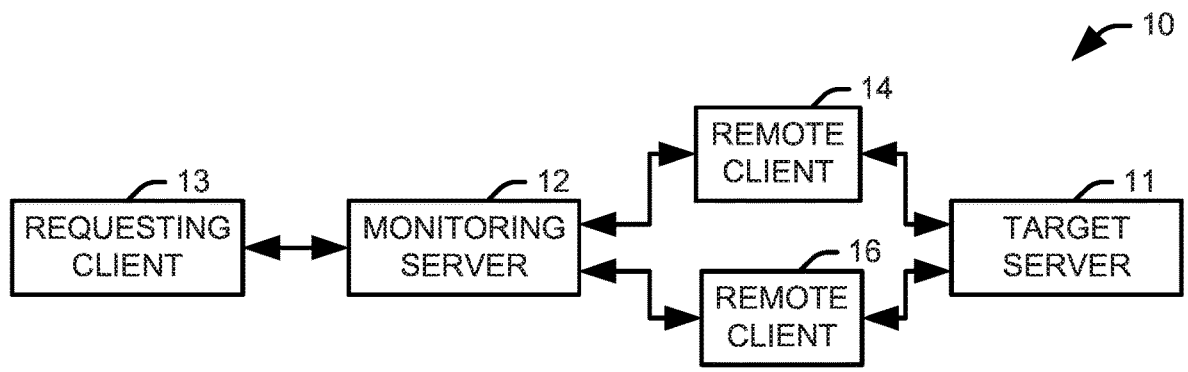
FIG. 1 illustrates one example of a system for monitoring a response at a target server in accordance with an aspect of the present invention.

Advertisements, free listings, and page content change frequently sometimes with each page re-load or re-visit. In addition, advertisements, free listings, and page content are often targeted to the consumer based on criteria including geo-location, past web browsing history, and/or device such as a computer versus a mobile computing device. One method to obtain visibility into the ads and content displayed is to manually visit the web pages. However, this method will not reveal all of the ads and listings due to geo-location limitations of the reviewer and the inability of a human reviewer to re-load pages with enough frequency to see enough volume.

Another method to obtain visibility into the ads, listings, and content displayed is to use robotic crawlers. Robotic crawlers are able to re-load pages with fast frequency in order to obtain many ads across large volumes of pages and search results. However, robotic crawlers have limitations including (1) geo-location: in order to elicit a true customer viewing experience the robotic crawler must be launched from a target location; (2) Blocking: many websites, like Google for example, impose rate limits on how often an IP address can access content on the site. Once the rate limit is met, the IP address is blocked from content access for a period of time. If an advertiser is attempting to view ads or listings at scale i.e. across millions of keywords, the IP address pool will need to be substantially large in order to avoid being blocked; (3) Real-person vs. bots: many websites may serve different content to the visitor if it determines a distinction that the visitor is a bot and not a real person which is sometimes determined based on re-cycling/over-using the same IP address over and over again in rapid succession.

In order for an advertiser to gain true value from monitoring online content, listings, and ads, it needs to obtain visibility via a data source that is capable of visiting pages at large scale volume, from either random geo-locations or advertiser specified geo-location targets, and to exhibit behavior that matches a real person and not a bot in order to elicit the appropriate consumer focused content and to not get blocked. The inventors have found that monitoring can be complicated if IP's are re-cycled too frequently causing the IP's to be blocked and/or by geography where the IP address needs to be tied to the geographic targeted location.

To solve for the above challenges, the inventors propose that the IP address and geographic location of a disparate network of large volumes of consumers can be used via the consumer's own device that is connected to the internet. By harnessing the IP addresses of real-people, robotic crawls can be launched from real-user IP addresses. The benefits of doing this are (1) no single IP address is overused and thus blocked; (2) the robotic crawlers look like normal Internet traffic; and (3) robotic crawls can be launched from specified geographic target locations.

To this end, the inventors propose offering a client that consumers install onto their internet connected device. Since the device is not under the control of the monitoring entity, the network of available devices evolves, shrinks, and grows and changes in concentration in geographic areas, from moment to moment as consumers go on and offline or install/uninstall the client. When a client is available, it reports into a server controlled by the monitoring entity, referred to herein as a monitoring server, such that the server is always aware of the make-up of the network as it evolves at any given time. The server does not pick an end-user's device until a request is made.

A request to look at a web page or search results is presented to the server, and will include geographic instructions which can either be a very specific geographic location, such as a specific metropolitan area or a zip code, or can be a more generalized location, such as a state, province, region, or country. The server reviews all of the consumer devices that are online at the moment and hones in on a pool of devices that are located in the geographic target, and selects an end-consumer device from the pool of qualifying devices based on the least used IP address. The request is then sent through to the selected end-consumer device whose internet connectivity is used to satisfy the request, and the resulting page content is then sent back through the server and directed to some end point. The client can operate in the background, such that the use of the device for the end-user is not interrupted.

FIG. 1 illustrates one example of a system 10 for monitoring a response at a target server 11 in accordance with an aspect of the present invention. The system 10 includes a monitoring server 12 that constructs a transmission control protocol (TCP) request for evaluation from a request received from an associated requesting client 13. The constructed TCP request is then provided to a plurality of remote clients 14 and 16. In accordance with an aspect of the present invention, the plurality of remote clients 14 and 16 can be geographically distributed, such that a first remote client 14 of the plurality of remote clients is located at a first location distant from the monitoring server 12 and a second remote client 16 of the plurality of remote clients is located at a second location distant from each of the monitoring server and the first location. By "distant," it is meant that a given remote client 14 and 16 is sufficiently distant from the monitoring server 12 that a response to a TCP request made from the remote client would be expected to provide a different response than a TCP request made from the server. For example, a client 14 would be "distant" from the monitoring server if it were located within another municipality.

During operation, the monitoring server 12 receives a TCP request from the requesting client 13. A client of the plurality of remote clients 14 and 16 is selected at the monitoring server 12 to service the TCP request. The TCP request is then provided from the monitoring server 12 to the selected client e.g., 14, who then provides the TCP request to at least one target server 11. It will be appreciated that the remote clients 14 and 16 may not be owned or controlled by the entity operating the monitoring server 12. For example, the remote clients 14 and 16 may be run in the background on a consumer electronic device, such as a personal computer or mobile device, In such a case, the device may be inactive, unable to provide a stable data connection, or otherwise unavailable. To this end, the monitoring server 12 can periodically attempt to communicate with each the plurality of remote clients 14 and 16 to ensure that they are available and select at least one of the available remote clients for the TCP request based on their location and other factors, such as the length of time since the remote client has been used.

The TCP response from the TCP request are received at the selected client e.g., 14, formatted for transmission, and sent to the monitoring server 12. A collected response across a plurality of remote clients 14 and 16 can represent a geographically diverse sampling of the response from the target server 11, allowing for evaluation of contractual and legal compliance for a specific geographic region or across a large area. Once the TCP response is received at the monitoring server 12, it can be logged at the server and forwarded to the requesting client 13.

Figure 2:
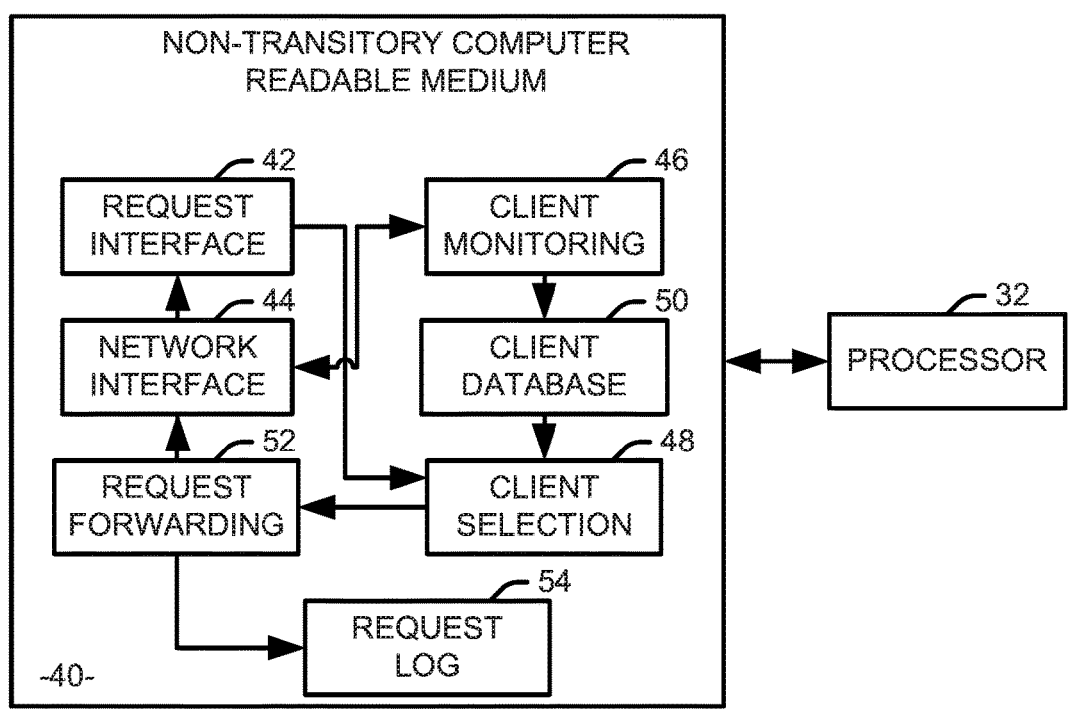
FIG. 2 illustrates an example of a server that could be used for monitoring a TCP response in accordance with an aspect of the present invention.

FIG. 2 illustrates an example of a server 30 that could be used for monitoring a TCP response in accordance with an aspect of the present invention. For example, the server 30 could be used to monitor the results given at one or more search engines to a given search request at various geographic locations. Alternatively, the server 30 can monitor a web page, such that the TCP response includes the page content, ads, and any dynamically served content targeted to the user such as display ads, sponsored content, product pricing, or an incentive offer like a sale, discount, cashback or any other buying incentive. The server 30 comprises at least one processor 32 and a non-transitory computer readable medium 40 storing instructions that are executable by the at least one processor. The instructions include a request interface 42 that receives a TCP request from a client (not shown) via a network interface 44. In one implementation, the received TCP request can include a geographic designation indicating at least one location for which the TCP request can be executed. In one example, the server can receive a TCP request from an associated remote client including custom headers with information about the region or regions for which the request should be submitted.

A client monitoring component 46 maintains a connection to each active remote client to provide a secure shell (SSH) tunnel through which the server can send requests. The server 30 can provide an application program interface (API) to each client, which the client uses to request connectivity information to establish the tunnel connection. In one implementation, the API can interact with authentication logic associated with the client monitoring component to verify the identity of the client and ensure a secure connection.

A client selection component 48 determines one or more remote clients suitable for a given TCP request using data from an associated client database 50. The client database 50 stores, for each client, an identifier, location information, configuration settings, and a status of the client. The client database receiving, from the client monitoring component 46, periodic updates on the availability of the plurality of clients. In one implementation, the client selection component 48 can utilize a geographic designation in the header of the request to route the request to a remote client associated with a geographic region or regions associated with the geographic designation. Where a client is not available in a requested region, the client selection component 48 can recursively search for available clients according to their geographic proximity to the region of interest. It will be appreciated that a given geographic designation can represent multiple regions, and thus the client selection component 48 may select multiple clients for a given TCP request. Further, where multiple clients are available within a requested geographic location, the client can be selected to balance the number of requests sent across the available clients. To this end, in one implementation, the client for which the longest period of time has elapsed since a TCP request has been forwarded to the client from the monitoring server can be selected. Alternatively, a random computer of the available computers can be selected.

A request forwarding component 52 restructures the TCP request for transmission to a client and transmits the TCP request to the selected client or clients via the network interface 44. The request forwarding component 52 also receives TCP responses returned from clients, and forwards them to a client submitting the TCP request. As part of this process, the request forwarding component 52 may restructure the returned TCP results to a format associated with the requesting client. In one implementation, the clients are standardized, such that the format in which the TCP request is sent and the format in which they are received is the same for all clients. It will be appreciated, however, that the request forwarding component 52 can be designed to be tolerant to differences across remote clients, such that TCP requests sent to different clients will be structured differently. A request log 54 can record at least the headers from each request provided to the server as well as the response from the client. In one implementation, the request log 54 also stores the URL that was the subject of the TCP request, the identity of the client handling the request, a duration for each step of the process, a total duration for the interaction, from reception of the TCP request from the requesting client to reception of the TCP response from the remote client, and a data size of each of the request and the response.

Figure 3:
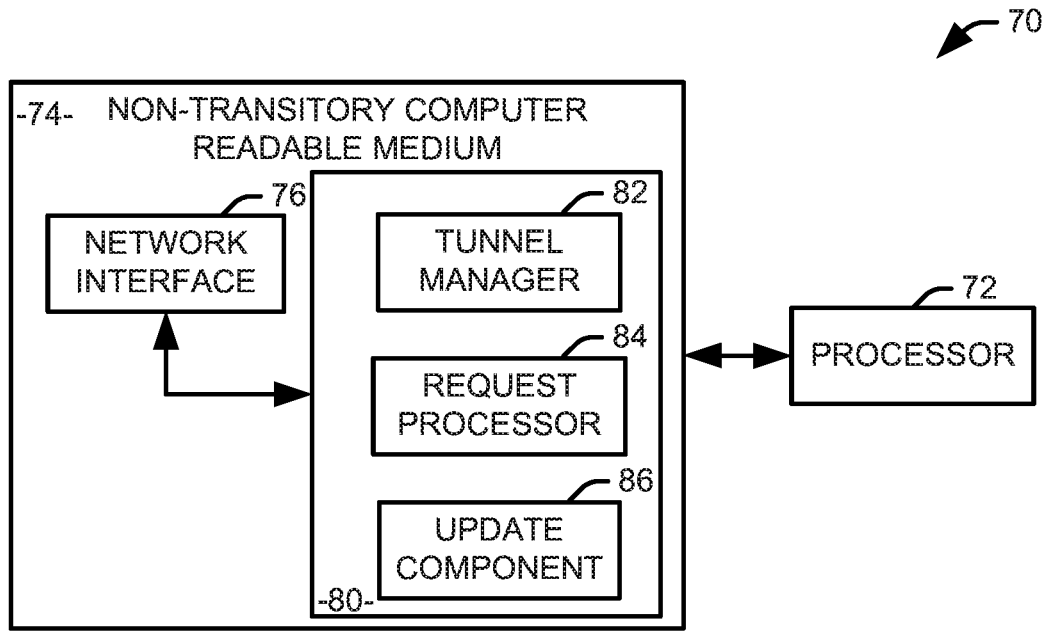
FIG. 3 illustrates one example of a remote client device that might be used for monitoring a TCP response in accordance with an aspect of the present invention.

FIG. 3 illustrates one example of a remote client device 70 that might be used for monitoring TCP results in accordance with an aspect of the present invention. For example, the remote client 70 could be used to monitor the results given at one or more search engines to a given search request at its associated geographic location as part of a network of geographically dispersed remote clients. The remote client device 70 comprises at least one processor 72 and a non-transitory computer readable medium 74 storing instructions that are executable by the at least one processor, including a network interface 76. In the illustrated example, the remote client device 70 is a consumer electronic device, such as a personal computer or a mobile device, with a software client 80 stored on the non-transitory computer readable medium 74 and executed by the processor 72. In one example, the client 80 can operate as a background application that listens for TCP requests from the server and forwards them to the appropriate target.

The software client 80 includes a tunnel manager 82 that maintains a connection back to a monitoring server. In one implementation, the tunnel manager 82 utilizes an API provided by the server to maintain a connection back to the server as an SSH tunnel. As a result, common firewall restrictions can be circumvented, allowing for a stable connection along which the server can pass HTTP requests, and the client can return HTTP responses. A request processor 84 listens to the tunnel connection for requests from the server, forwards the requests to a target provider for the TCP request, and passes a response to the TCP request back to the monitoring server. In one implementation, the tunnel manager 82 and the request processor 84 can be configured such that the client functions as a bidirectional transmission control protocol (TCP) bridge between the monitoring server and the target provider. The software client 80 can further include an update component 86 that communicates with the server to determine if any updates are present at the server. When an update is found, the update component 86 downloads and installs the update.

Figure 4:
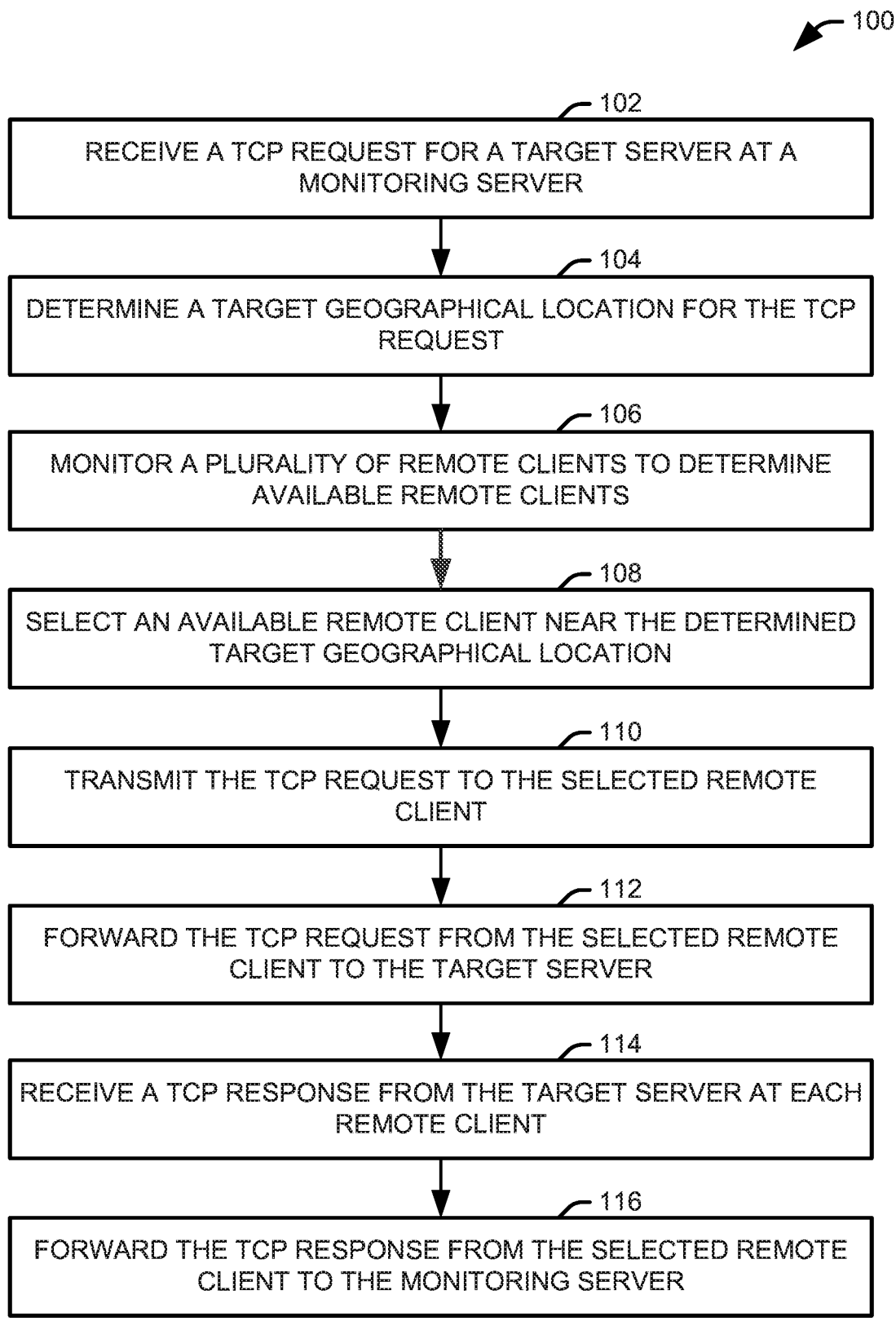
FIG. 4 illustrates a method for monitoring a TCP response in accordance with an aspect of the present invention.

In view of the foregoing structural and functional features described above in FIGS. 1-3, an example method will be better appreciated with reference to FIG. 4. While, for purposes of simplicity of explanation, the method of FIG. 4 is shown and described as executing serially, it is to be understood and appreciated that the present invention is not limited by the illustrated order, as some actions could in other examples occur in different orders and/or concurrently from that shown and described herein.

FIG. 4 illustrates a method 100 for monitoring a TCP response in accordance with an aspect of the present invention. At 102, a TCP request for a target server is received at a monitoring server. For example, the TCP request is submitted from a client associated with the monitoring server, although it will be appreciated that the TCP request can be provided at a user interface local to the server. In one implementation, the TCP request is a search request, the target server is a search engine, and a response from the target server is a set of search results. At 104, a target geographic location for the TCP request is determined. In one implementation, the target geographic location can be determined by parsing a header of the received TCP request. In another implementation, determining the target geographic location for the TCP request comprises selecting a default set of geographic locations representing one of a state, a province, an economic zone, and a country.

At 106, a plurality of remote clients are monitored to determine which remote clients are available. At 108, a remote client is selected from the available remote clients to be within or near a region defined by the determined target geographic location. In general, the selected client will be geographically separated from the monitoring server, such that any TCP request forwarded from the client will originate from a geographic location distinct from that of the monitoring server. In one implementation, one or more active remote clients within the indicated geographic location are selected. Where no active clients are available at a specific location, a set of at least one available client closest to the determined target geographic location is selected. Where more clients are available than are required, one or more clients that have been used least over a recent time period can be selected to avoid overburdening any one client or one or more clients can be selected randomly.

At 110, the TCP request from the monitoring server is transmitted to the selected client. It will be appreciated that, to ensure that a secure connection is available between the server and the client or clients, the server and the client can be configured to establish an SSH tunnel between the monitoring server and each of the at least one client. For example, the server can provide an HTTP application program interface (API) from the server to each client and the client can utilize the API to request connectivity information from the server to establish the tunnel connection. At 112, the TCP request is forwarded from the client to the target server. At 114, a TCP response is received from the target server at the client, and at 116, the TCP response is forwarded from the client to the monitoring server. In one implementation, each of the TCP request and the TCP response are logged at the server and retained for analysis by a user or another program. For example, the logged requests and responses could be evaluated to ensure legal or contractual compliance of the target server in the provision of advertisements.

Figure 5:
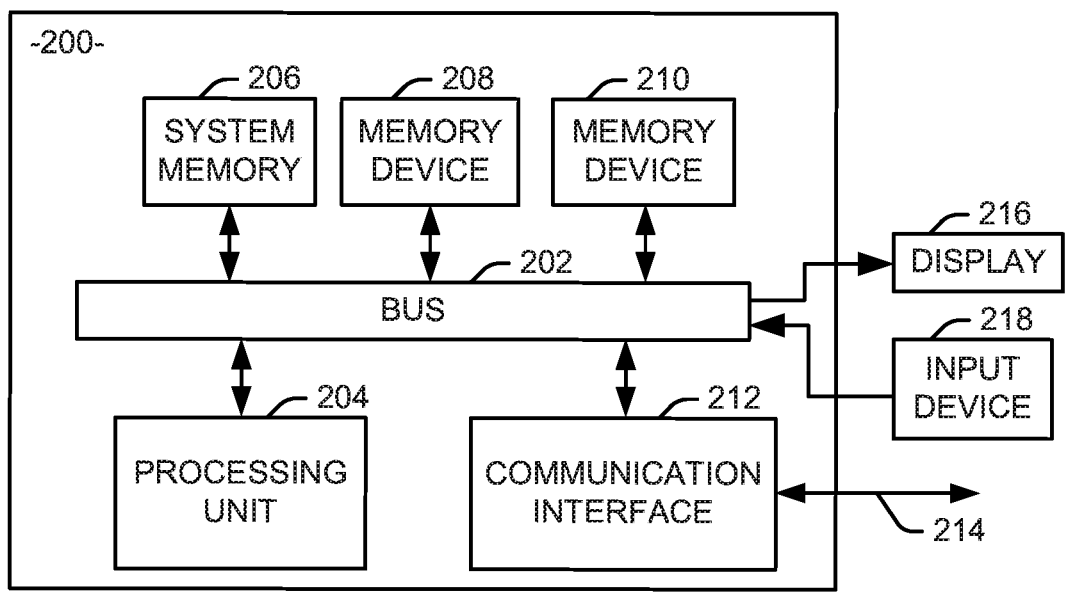
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, or other computing device.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, standalone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include at least one processing core. The additional memory devices 206, 208, and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings. Additionally or alternatively, the system 200 can access an external data source or query source through the communication interface 212, which can communicate with the system bus 202 and the communication link 214.

In operation, the system 200 can be used to implement one or more parts of a monitoring system in accordance with the present invention. Computer executable logic for monitoring responses to TCP requests resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a set of one or more non-transitory media that participate in providing instructions to the processing unit 204 for execution. These media can be local to the process or connected via a local network or Internet connection.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method comprising:
    transmitting a transmission control protocol (TCP) request identifying a target server and at least one target geographic location from a requesting client to a monitoring server;
    determining the at least one target geographic location for the TCP request at the monitoring server by parsing a header of the TCP request, based on a geographic instruction specified by the requesting client;
    monitoring a plurality of remote clients to determine a plurality of available remote clients, the plurality of available remote clients being a proper subset of the plurality of remote clients;
    selecting a client of a plurality of available remote clients within a threshold distance of a location of the determined at least one target geographic location, the client being geographically distant from the monitoring server to produce a response to a TCP request made from the client that is different than a response to another TCP request made from the monitoring server;
    transmitting the TCP request from the monitoring server to the selected client;
    forwarding the TCP request from the client to the target server;
    receiving a TCP response from the target server at the client; and
    forwarding the TCP response from the client to the monitoring server.

2. The method of claim 1, wherein selecting the client comprises selecting a client for each of the at least one geographic location.

3. The method of claim 1, wherein determining the target geographic location for the TCP request comprises selecting a default set of geographic locations representing one of a state, a province, an economic zone, and a country, and selecting the client comprises selecting a client for each of the default set of geographic locations.

4. The method of claim 1, further comprising establishing a secure shell (SSH) tunnel between the monitoring server and the client.

5. The method of claim 4, wherein establishing the SSH tunnel between the monitoring server and the client comprises providing an application program interface (API) from the server to the client and using the API at the client to request connectivity information from the server to establish the tunnel connection.

6. The method of claim 1, further comprising logging each of the TCP request and the TCP response at the server.

7. The method of claim 1, wherein selecting the client from the monitoring server from the determined at least one target geographic location comprises, for each of the at least one target geographic location, selecting a set of available remote clients that are closest to the determined target geographic location, and selecting a client of the set of available remote clients for which the longest period of time has elapsed since a TCP request has been forwarded to the client from the monitoring server.

8. The method of claim 1, wherein selecting the client from the monitoring server from the determined at least one target geographic location comprises, for each of the at least one target geographic location, selecting a set of available remote clients that are closest to the determined target geographic location, and randomly selecting a client of the set of available remote clients.

9. The method of claim 1, wherein the target server hosts a web page, the TCP response includes the page content, ads, and any dynamically served content targeted to the user.

10. A system comprising;
a processor; and
a non-transitory computer readable medium storing machine readable instructions executable by the processor, the machine readable instructions comprising:
   a request interface that receives a transmission control protocol (TCP) request from a user, wherein the TCP request identifies a target server and at least one target geographic location;
   a client database storing parameters for a plurality of remote clients;
   a client monitoring component that monitors the plurality of remote clients to determine which remote clients of the plurality of remote clients are available and maintains a connection to the available remote clients, wherein the remote clients are determined by parsing a header of the TCP request based on a geographic instruction specified by the TCP request received from the user;
   a client selection component that selects a client from the available remote clients for the TCP request using the para meters from the client database, wherein the client is geographically distant from the monitoring component to produce a response to a TCP request made from the client that is different than a response to another TCP request made from the monitoring component; and
   a request forwarding component that restructures the TCP request for transmission to the selected client, transmits the search request to the selected client, and receives a TCP response from the client.

11. The system of claim 10, wherein the client database stores, for each of the plurality of remote clients, an identifier, a location, and a current availability of the client, the client database receiving, from the client monitoring component, periodic updates on the availability of the plurality of remote clients.

12. The system of claim 11, wherein the client selection component selects the client according to their location relative to the at least one target geographic location.

13. The system of claim 10, further comprising a logging component that logs each of the TCP request and the TCP response from the client at the server.

14. The system of claim 10, wherein the target server hosts a search engine, the TCP request includes at least one search term, and each TCP response includes search results for the at least one search term at the search engine.

15. The system of claim 10, each of the plurality of remote clients comprising a tunnel manager that maintains a connection back to a monitoring server as a secure shell (SSH) tunnel and a request processor that listens to the tunnel connection for requests from the server, forwards the requests to a target provider for a search request, and passes a response to the search request back to the monitoring server.

16. The system of claim 15, wherein the tunnel manager and the request processor can be configured such that the selected client functions as a bidirectional transmission control protocol (TCP) bridge between the monitoring server and the target server.

17. The system of claim 10, each of the plurality of remote clients further comprising an update component that communicates with the server to determine if an update is present at the server, downloads the update, and installs the update.

18. The system of claim 10, wherein each of the plurality of remote clients comprises a consumer electronic device running client software in the background.

19. The system of claim 10, wherein the system is at a first location and at least one of the plurality of remote clients is at a second location that is geographically distant from the first location.

20. A method comprising:
transmitting a search request identifying at least one target geographic location from a requesting client to a monitoring server;
determining the at least one target geographic location for the search request, based on a geographic instruction specified by the requesting client;
monitoring a plurality of remote clients to determine a plurality of available remote clients, the plurality of available remote clients being a proper subset of the plurality of remote clients;
selecting a client of the plurality of available remote clients that is within a threshold distance of a location of the determined at least one target geographic location and geographically distant from the monitoring server to produce a response to the search request made from the client that is different than a response to another search request made from the monitoring server;
transmitting the search request from the monitoring server to the selected client;
forwarding the search request from the client to the target search engine;
receiving a set of search results from the target search request at the client; and
forwarding the set of search results from the client to the monitoring server.

* * * * *